United States Patent [19]
Corr

[11] Patent Number: 5,106,442
[45] Date of Patent: Apr. 21, 1992

[54] METHOD FOR PRODUCING COLLAR REINFORCEMENTS ON CYLINDRICAL COMPOSITE FIBER BODIES

[75] Inventor: Horst Corr, Übach-Palenberg, Fed. Rep. of Germany

[73] Assignee: Uranit GmbH, Jülich, Fed. Rep. of Germany

[21] Appl. No.: 547,285

[22] Filed: Jul. 3, 1990

[30] Foreign Application Priority Data

Jul. 7, 1989 [DE] Fed. Rep. of Germany ....... 3922335

[51] Int. Cl.$^5$ ............................................. B65H 81/00
[52] U.S. Cl. .................................. 156/171; 156/169; 156/172; 156/173; 156/250; 285/423; 464/181
[58] Field of Search ............... 156/166, 169, 172, 171, 156/173, 175, 245, 425, 250, 428–431, 190–193, 187; 464/181, 902, 903; 285/405, 422, 423, 425; 264/136, 137, 258; 138/109

[56] References Cited

U.S. PATENT DOCUMENTS

| | | | |
|---|---|---|---|
| 4,049,482 | 9/1977 | Webb | 156/172 |
| 4,359,356 | 11/1982 | Kornbichler et al. | |
| 4,605,385 | 8/1986 | Pück et al. | 464/181 |
| 4,980,006 | 12/1990 | Bordner | 156/173 X |

FOREIGN PATENT DOCUMENTS 3029890 9/1985 Fed. Rep. of Germany .

Primary Examiner—Jeff H. Aftergut
Attorney, Agent, or Firm—Spencer & Frank

[57] ABSTRACT

A method of producing a collar on a cylindrical composite fiber body, wherein the composite fiber body has a longitudinal axis and wherein a plurality of layers of resin impregnated fiber windings are wound to form the composite fiber body, after which the resin is hardened, includes the following steps: (a) forming a bead by winding resin impregnated fiber windings circumferentially about the cylindrical composite fiber body such that the bead has continuously rising flanks on both longitudinally spaced sides; (b) providing two clamping sleeves, each clamping sleeve having an end face extending substantially orthogonally to the longitudinal axis of the composite fiber body, a conical surface portion adjacent the end face, and an interior surface portion which is adjacent the conical surface portion and which conforms to the outer surface of the cylindrical composite fiber body; (c) applying the clamping sleeves about the composite fiber body while the composite fiber body is still wet, such that each end face lies against a respective one of the flanks; (d) tightening the clamping sleeves about the composite fiber body while the composite fiber body is still wet; (e) forming a collar between the end faces while the composite fiber body is still wet, by winding resin impregnated fiber windings circumferentially about the bead; and (f) loosening and releasing the clamping sleeves.

14 Claims, 2 Drawing Sheets

METHOD FOR PRODUCING COLLAR REINFORCEMENTS ON CYLINDRICAL COMPOSITE FIBER BODIES

CROSS-REFERENCE TO RELATED APPLICATION

The present disclosure relates to the subject matter disclosed in German Application No. P 39 22 335.3 of July 7th, 1989, the entire specification of which is incorporated herein by reference.

BACKGROUND OF THE INVENTION

The present invention relates to a method for producing collar or flange shaped reinforcements on cylindrical composite fiber bodies, and particularly on wound composite fiber pipes or tubes, in which several layers of resin impregnated fiber layers are wound on top of one another along the regions of the composite body to be reinforced, after which the resin is hardened.

German Patent No. 3,029,890, which corresponds to U.S. Pat. No. 4,359,356, discloses a method of producing composite fiber pipes which have collar or flange shaped reinforcements at the ends of the pipes. In this case, several layers of circumferential and crisscross windings of plastic impregnated fibers, e.g. carbon fibers, are initially wound on top of one another on a winding mandrel. Then, additional circumferential windings are applied along the regions of the composite pipe to be reinforced. Thereafter the composite pipe is severed at the reinforced regions so that several pipe sections are obtained which have flange-like reinforced ends. However, the reinforcements obtained with this method have a thickness that is little more than the wall thickness of the composite pipe since the fiber windings at the sides of the reinforcements have a relatively flat slope angle, also referred to as a natural angle, i.e. the steepest angle which can be produced during winding as a consequence of the physical properties of the fiber being wound and the geometry of the structure formed by the winding process. However, these sides of the reinforcements take up additional space as compared with a reinforcement having orthogonal flange walls. This is a primary reason why it is not possible using this type of known technology, i.e. by winding only perpendicularly to the longitudinal axis of the pipe, to produce flange faces of a conventional shape having orthogonal flange walls as are used, for example, for flanges of metal pipes which have side walls that extend perpendicularly to the longitudinal axis of the pipe.

SUMMARY OF THE INVENTION

It is therefore an object of the present invention to provide a method of this type with which it is possible by simple means to produce collar or flange like reinforcements on cylindrical composite bodies without significant subsequent milling work, with such windings having a substantially predeterminable geometry with frontal faces that extend essentially perpendicularly to the longitudinal axis of the pipe.

The above and other objects are accomplished according to the method of the invention in that: a collar is produced on a cylindrical composite fiber body, wherein the composite fiber body has a longitudinal axis and wherein a plurality of layers of resin impregnated fiber windings are wound to form the composite fiber body, after which the resin is hardened, including the steps of:

(a) forming a bead by winding resin impregnated fiber windings circumferentially about the cylindrical composite fiber body such that the bead has continuously rising flanks on both longitudinally spaced sides;

(b) providing two clamping sleeves, each clamping sleeve having an end face extending substantially orthogonally to the longitudinal axis of the composite fiber body, a conical surface portion adjacent the end face, and an interior surface portion which is adjacent the conical surface portion and which conforms to the outer surface of the cylindrical composite fiber body;

(c) applying the clamping sleeves about the composite fiber body while the composite fiber body is still wet, such that each end face lies against a respective one of the flanks;

(d) tightening the clamping sleeves about the composite fiber body while the composite fiber body is still wet;

(e) forming a collar between the end faces while the composite fiber body is still wet, by winding resin impregnated fiber windings circumferentially about the bead; and (f) loosening and releasing the clamping sleeves.

According to another feature of the invention, the bead can be formed to further include at least one band of woven fibers in the bead which are wound during the above-mentioned step (a).

In a further aspect of the invention, between the abovementioned steps (b) and (c), a release agent is applied to each end face, each conical surface portion, and each interior surface portion.

Moreover, according to another aspect of the invention, the cylindrical composite fiber body is wound about a mandrel, wherein the clamping sleeves have the same coefficient of thermal expansion as that of the mandrel.

Additionally, according to another aspect of the invention, during the above-mentioned steps (c)–(e), each of the clamping sleeves is maintained at the same temperature as that of the mandrel.

The present invention makes it possible to produce, on a closely defined region of the composite body, a collar or flange of predetermined thickness and height without notch stresses and with end faces or end face portions that extend perpendicularly to the longitudinal axis of the pipe. Subsequent milling work, which might adversely affect strength, is not required.

The invention will be described in greater detail below with reference to an embodiment which is illustrated in the drawings.

DETAILED DESCRIPTION OF THE PREFERRED EMBODIMENT

Figure 1:
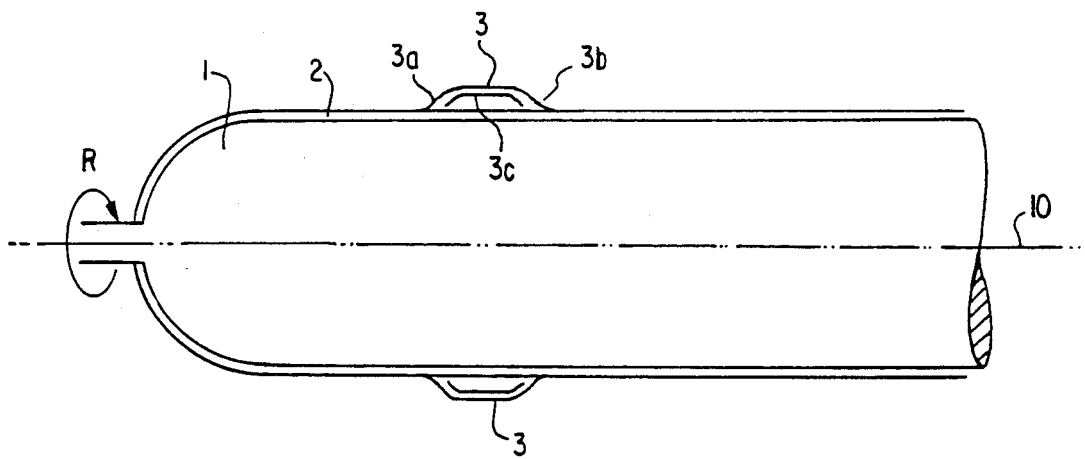
FIG. 1 schematically illustrates a side elevational view of a cylindrical composite fiber body wound about a mandrel, a bead being formed on the cylindrical composite fiber body.

A bead 3 of fibers impregnated with synthetic resin is formed by winding fibers onto a still "wet" composite fiber pipe 2 which is wound around a mandrel 1 as shown in FIG. 1. The mandrel is rotatable in the direction indicated by the arrow R about an axis 10. The bead 3 is formed by the winding of fibers along a region to be reinforced and has longitudinally spaced flanks 3a and 3b which slope on both sides of the bead 3 at a "natural" angle, i.e. the steepest angle which can be produced during winding as a consequence of the physical properties of the fiber being wound and the geometry of the structure formed by the winding process. A woven band 3c can also be formed which is wound into the bead 3 so as to increase the bending strength of the collar or flange to be produced.

Figure 2:
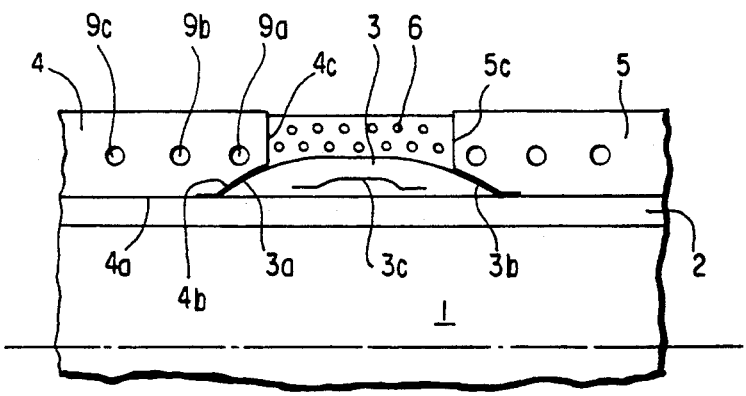
FIG. 2 is a schematic, enlarged view of the bead of FIG. 1 with a clamp disposed on either side of the bead and a collar wound on the bead between the clamps.

Two clamping sleeves 4 and 5, having respective frontal faces 4c and 5c and bores 9a, 9b, and 9c as shown in FIG. 2, are positioned on either side of the bead 3. Then, the clamping sleeves 4 and 5 are respectively pressed against the two flanks 3a and 3b of the bead 3. Following this, the sleeves 4 and 5 are tightened together to form an annular space between the faces 4c and 5c.

The annular space formed between the two frontal faces 4c and 5c is filled with further fiber windings 6 of synthetic resin impregnated fibers, e.g. carbon fibers, so as to form a collar having side walls which are substantially orthogonal to the longitudinal axis of the mandrel. After gelling and hardening of the composite pipe 2, the bead 3, and the fiber windings 6, the clamping sleeves 4 and 5 are loosened and removed from the mandrel 1.

Figure 3:
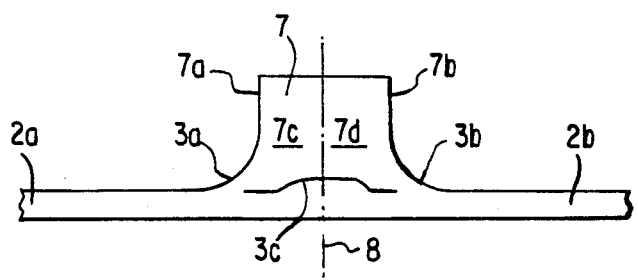
FIG. 3 is a schematic side view of the finished collar of FIG. 2 on the cylindrical composite fiber body.

A collar 7 is thereby formed, as shown in FIG. 3. The collar 7 is integral with the pipe 2 since the bead 3 as well as the windings 6 are applied while the pipe 2 is still "wet". The flanks 3a and 3b of the collar 7 form a natural transition region between the pipe 2 and the perpendicular end faces 7a and 7b, and this transition region prevents the development of notch stresses. If necessary, the collar 7 can be severed in a direction which is perpendicular to the longitudinal axis of pipe 2, i.e. along a separation line 8, as shown in FIG. 3, to form two separate pipe sections 2a and 2b, each of the separate pipe sections 2a and 2b having a respective wound-on collar 7c or 7d.

The clamping sleeves 4 and 5 are preferably composed of a spring elastic material. The sleeve 4 is shown in detail in FIG. 4 and is similar in construction to the sleeve 5. The sleeve 4 has a longitudinal slot 9 which is parallel to the longitudinal axis of the mandrel 9. The sleeve 4 is penetrated by several clamping screws which extend through bore 9a, 9b, and 9c and which bridge the slot 9 to compress the sleeve 4 so as to reduce the width of the slot 9.

In a compressed state of the sleeve 4, the inner surface of the clamping sleeve 4 has a cylindrical portion 4a which closely corresponds to the outer surface of the pipe 2. Near the end face 4c, the interior surface of the sleeve 4 changes from the cylindrical interior shape of the cylindrical portion 4a to a conical shape of an interior portion of a conical region 4b. The conical region 4b is shaped to conform to the flank 3a of the bead 3 The end face 4c follows the conical region 4b, and has a height relative to the outer surface of the pipe 2 which is at least equal to the height of the collar 7 relative to the pipe 2.

The clamping sleeves 4 and 5 preferably have the same coefficient of thermal expansion as the winding mandrel 1 and are maintained during use at the same temperature as the mandrel 1. In order to facilitate removal of the sleeves from the mandrel 1 after loosening of the screws through bore 9a, 9b, 9c, a release agent is applied to the faces 4a, 4b, 4c of the clamping sleeves, since these faces come in contact with the synthetic resin.

The surfaces of the pipe 2 and the collar 7, produced by the sleeves 4 and 5 in the foregoing method, are extremely smooth, are sealed, and are very true to dimension. As a result, milling work can be omitted in most cases, which is advantageous since such milling work would injure the fibers and weaken the resultant article.

Figure 4:
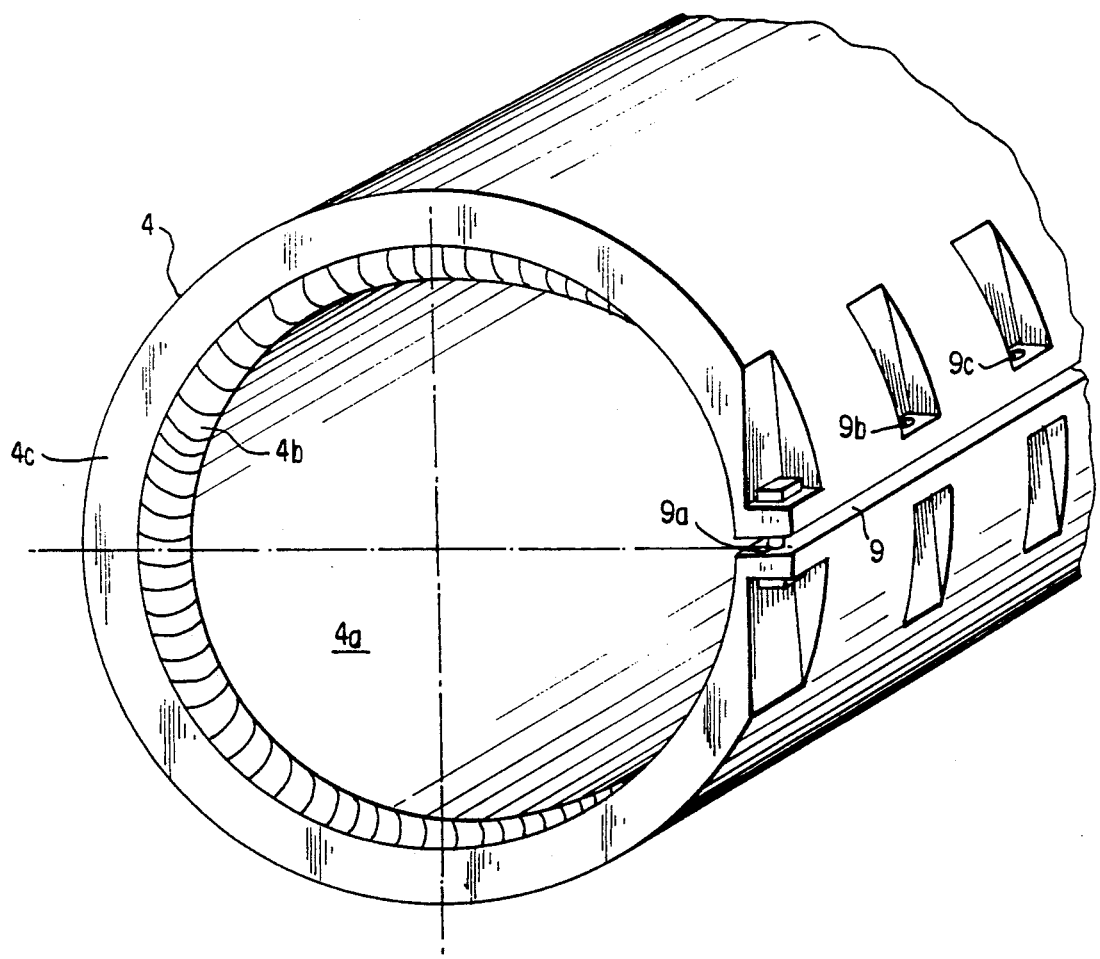
FIG. 4 is a perspective view of a clamp usable in the present invention.

Instead of the one-piece clamping sleeves 4 and 5 shown in FIG. 4 having respective longitudinal slots, sleeves having two or more parts may also be employed. These multi-part sleeves would likewise be placed about the mandrel 1 and the fiber pipe 2, and then tightened against the pipe 2 and the bead 3 by screws or other tightening means, e.g. tightening bands. Alternatively, the end faces 4c and 5c of the clamping sleeves 4 and 5, respectively, may be modified so that the space between the end faces 4c and 5c, which is to be filled with fiber windings, has, for example, stepped end faces or concave end faces.

It will be understood that the above description of the present invention is susceptible to various modifications, changes and adaptations, and the same are intended to be comprehended within the meaning and range of equivalents of the appended claims.

What is claimed is:

1. A method of producing a collar on a cylindrical composite fiber body, wherein the composite fiber body has a longitudinal axis and wherein a plurality of layers of resin impregnated fiber windings are wound to form the composite fiber body, after which the resin is hardened, comprising the steps of:
   (a) forming a bead by winding resin impregnated fibers windings circumferentially about said cylindrical composite fiber body such that said bead has two longitudinally spaced sides with continuously rising flanks;
   (b) providing two clamping sleeves, each said clamping sleeve having an end face extending substantially orthogonally to the longitudinal axis of said composite fiber body, a conical surface portion adjacent said end face, and an interior surface portion which is adjacent said conical surface portion and which conforms to an outer surface of said cylindrical composite fiber body;
   (c) applying said clamping sleeves about said composite fiber body before the resin of said composite fiber body is hardened, such that each said conical surface portion lies against a respective one of said flanks;
   (d) tightening said clamping sleeves about said composite fiber body before the resin of said composite fiber body is hardened;
   (e) forming a color between said end faces before the resin of said composite fiber body is hardened, by winding resin impregnated fiber windings circumferentially about said bead;
   (f) hardening the resin of said composite fiber body and said collar; and
   (g) loosening and releasing said clamping sleeves.

2. A method as defined in claim 1, further comprising winding at least one band of woven fibers in said bead during said step (a).

3. A method as defined in claim 1, further comprising, between steps (b) and (c), the step of applying a release agent to each said end face, each said conical surface portion, and each said interior surface portion.

4. A method as defined in claim 1, wherein said cylindrical composite fiber body is wound about a mandrel, said mandrel having a coefficient of thermal expansion, and wherein step (b) is conducted by providing clamping sleeves with a coefficient of thermal expansion the same as that of said mandrel.

5. A method as defined in claim 4, wherein, during said steps (c)–(e), each of said clamping sleeves is maintained at a temperature the same as that of said mandrel.

6. A method of producing a cylindrical composite fiber body having a collar, comprising the steps of:
  (a) winding a plurality of layers of resin impregnated fiber windings about a mandrel to form a composite fiber body having a longitudinal axis;
  (b) forming a bead by winding resin impregnated fiber windings circumferentially about said cylindrical composite fiber body such that said bead has two longitudinally spaced sides with continuously rising flanks;
  (c) providing two clamping sleeves, each said clamping sleeve having an end face extending substantially orthogonally to the longitudinal axis of said composite fiber body, a conical surface portion adjacent said end face, and an interior surface portion which is adjacent said conical surface portion and which conforms to an outer surface of said cylindrical composite fiber body;
  (d) applying said clamping sleeves about said composite fiber body, such that each said conical surface portion lies against a respective one of said flanks;
  (e) tightening said clamping sleeves about said composite fiber body;
  (f) forming a collar between said end faces by winding resin impregnated fiber windings circumferentially about said bead;
  (g) hardening the resin of said composite fiber body and said collar; and
  (h) loosening and releasing said clamping sleeves.

7. A method as defined in claim 6, further comprising winding at least one band of woven fibers in said bead during said step (a).

8. A method as defined in claim 6, further comprising, between steps (b) and (c), the step of applying a release agent to each said end face, said conical surface portion, and each said interior surface portion.

9. A method as defined in claim 6, wherein said cylindrical composite fiber body is wound about a mandrel, said mandrel having a coefficient of thermal expansion, and wherein step (b) is conducted by providing clamping sleeves with a coefficient of thermal expansion the same as that of said mandrel.

10. A method as defined in claim 9, wherein, during said steps (c)–(e), each of said clamping sleeves is maintained at a temperature the same as that of said mandrel.

11. A method of producing a cylindrical composite fiber body having a collar, comprising the steps of:
  (a) winding at least one layer of resin impregnated material about a mandrel to form a cylindrical composite fiber body having a longitudinal axis;
  (b) forming an annular bead on the composite fiber body by winding at least one further layer of resin impregnated material around the composite fiber body, the bead having a top surface that is spaced apart from the composite fiber body and two sloping flanks that extend from the top surface to the composite fiber body; and
  (c) forming an extension on the bead, the extension having two spaced-apart flat sides that are perpendicular to the longitudinal axis of the composite fiber body, each flat side extending from a respective one of the sloping flanks of the bead, step (c) being conducted by shielding the sloping flanks while winding at least one additional layer of resin impregnated material around the top surface of the bead.

12. The method of claim 11, wherein steps (b) and (c) are conducted while the composite fiber body formed in step (a) remains on the mandrel, and further comprising the step of curing the resin of the composite fiber body, the bead, and the extension simultaneously.

13. The method of claim 11, further comprising the step of cutting the composite fiber body, the bead, and the extension along a plane that is perpendicular to the longitudinal axis of the composite fiber body and that bisects the extension.

14. The method of claim 11, wherein step (c) comprises mounting a pair of clamping sleeves on the composite fiber body, each clamping sleeve having an end face lying in a plane that is perpendicular to the longitudinal axis of the composite fiber body, an interior surface portion which conforms to an outer surface of the composite fiber body, and a tapered portion between the end face and the interior surface portion, the clamping sleeves being mounted on the composite fiber body in such a manner that their tapered portions overlap the flanks of the bead and their end faces are spaced apart to provide a gap over the top surface of the bead, and wherein step (c) further comprises winding the at least one further layer of resin impregnated material in the gap.

* * * * *